(12) United States Patent
Grush

(10) Patent No.: US 7,215,255 B2
(45) Date of Patent: May 8, 2007

(54) METHOD AND APPARATUS FOR A SATELLITE POSITIONING-BASED METERING SYSTEM FOR USE IN TRANSPORT-RELATED APPLICATIONS

(76) Inventor: Bernard Grush, 34 Dodge Road, Toronto Ontario (CA) M1N 2A7

( * ) Notice: Subject to any disclaimer, the term of this patent is extended or adjusted under 35 U.S.C. 154(b) by 255 days.

(21) Appl. No.: 10/760,279

(22) Filed: Jan. 21, 2004

(65) Prior Publication Data

US 2004/0181495 A1 Sep. 16, 2004

Related U.S. Application Data

(60) Provisional application No. 60/507,502, filed on Oct. 2, 2003.

(30) Foreign Application Priority Data

Jan. 21, 2003 (CA) .................................... 2417060

(51) Int. Cl.
*B60Q 1/48* (2006.01)
(52) U.S. Cl. ..................... 340/932.2; 340/933; 340/988
(58) Field of Classification Search ................ 340/436, 340/438, 902, 903, 932.2, 933, 934, 935, 340/937, 988, 990; 701/1, 29, 301
See application file for complete search history.

(56) References Cited

U.S. PATENT DOCUMENTS

| | | | |
|---|---|---|---|
| 5,721,678 A | 2/1998 | Widl | |
| 6,408,232 B1 * | 6/2002 | Cannon et al. | 701/29 |
| 6,493,676 B1 | 12/2002 | Levy et al. | |
| 6,657,535 B1 * | 12/2003 | Magbie et al. | 340/5.31 |
| 6,732,031 B1 * | 5/2004 | Lightner et al. | 701/33 |
| 6,768,944 B2 * | 7/2004 | Breed et al. | 701/301 |
| 6,895,310 B1 * | 5/2005 | Kolls | 701/1 |

OTHER PUBLICATIONS

Pricing Urban Transport, European Transport Pricing Initiative Newsletter, Issue No. 4, Sep. 4, 2002 (http:/www.transport-pricing.net/CUPID4.pdf).
Hints to Successful Implementation of Electronic Road Pricing System (http://www.itshongkong.com/report/erp.html.
Executive Summary (http:/www.info.gov.hk/td/eng/publication/images/erp.pdf.
UK Search Report, Application No. GB0421671.9.

* cited by examiner

*Primary Examiner*—Van T. Trieu
(74) *Attorney, Agent, or Firm*—Deeth Williams Wall

(57) ABSTRACT

A system and method for monitoring, measuring, and/or usage metering of a vehicle involving tracking continuous movement and position of the vehicle for priced parking spots, priced roads, and/or pay-as-you-drive insurance. The system comprises a vehicle-mounted apparatus incorporating positioning signal reception, filtering, compression, storage and wireless transmission, while a central processing system collects these position-logs for matching with digital maps and parking, road use, and insurance fee application schedules. Sufficient accuracy and precision enables billing of vehicle owners unambiguously, generating timely congestion and traffic maps, and providing real time data feeds to signal control and navigation systems. This invention may be used to meter parking, road use, or insurance, either alone or concurrently in combination.

20 Claims, 4 Drawing Sheets

METHOD AND APPARATUS FOR A SATELLITE POSITIONING-BASED METERING SYSTEM FOR USE IN TRANSPORT-RELATED APPLICATIONS

CROSS-REFERENCE TO RELATED APPLICATIONS

This application claims the benefit under 35 USC §119(e) of the following patent applications, the disclosures of which are hereby incorporated by reference thereto in their entirety: Canadian Ser. No. 2,417,060 filed Jan. 21, 2003; and U.S. Ser. No. 60/507,502 filed Oct. 2, 2003.

TECHNICAL FIELD OF THE INVENTION

This invention is related to the fields of Intelligent Transportation Systems and Transportation Demand Management, more specifically to applications to user-pay or usage-pricing such as parking pricing, road use pricing (also known as congestion pricing, electronic toll collection (ETC) or electronic road pricing (ERP)), and pay-as-you-drive insurance.

The Background of the Problem: Parking Pricing

Parking is a large industry, especially in urban areas of the developed world. Enormous sums of money flow through this industry which is straddled with well-known inefficiencies and related losses for all stakeholders.

Parking is a significant expense for many urban dwellers in the developed world. For some, parking may be the $8^{th}$ or $10^{th}$ single largest expense following mortgage, vehicle, food, education, clothing, etc. The activity of finding and paying for a parking spot is a nuisance at best. The confusion regarding how much to pay and how long to pay for, or the frustration of overpaying, underpaying, leaving meetings prematurely or risking/receiving fines adds to the stress of using parking services.

The business of collecting parking fees is a complex business for owner/operators of parking lots. It is subject to large volumes of bookkeeping, pilferage and user abuse (estimated in some segments of the industry to be 10–15%), wages for attendants, high purchase and maintenance costs for ticket vending machines, lift gates, kiosks, meters, pay+display machines, and complex and varied loyalty arrangements with local businesses wishing to attract customers to their shops.

The business of parking enforcement on the part of municipalities is complex and expensive. Meters and pay+display machines clutter municipal streets and parking lots while their cost erodes parking revenues. Once costs are posted and meters are calibrated, changing prices or price regimes is complex, costly and time consuming, minimizing the opportunity to use parking as a traffic demand management (TDM) tool.

In some areas, parking is scarce while many small locations that could be used for parking are not used because of the problem of uneconomical metering and enforcement. Conversely, the shortage of parking in some locales encourages drivers to use such parking spaces without payment ("spillover"), sometimes using spaces intended for the use of retail customers, causing business losses to retail owners.

This invention addresses all of these issues.

A number of patents have been issued for parking and road pricing systems (Table 1). This invention addresses some of the disadvantages inherent in such systems.

TABLE 1

| Patent Documents | |
|---|---|
| Jurisdiction and Serial No. | Issue or Filing Date |
| U.S. Pat. No. 5,490,079 | Feb. 6, 1996 |
| U.S. Pat. No. 6,493676 | Issued Dec. 10, 2002 |
| U.S. Pat. No. 5,721,678 | Issued Feb. 24, 1998 |
| U.S. Patent Application No. 20030146852 | Filed Aug. 7, 2003 |
| PCT Patent Application No. PCT/DE00/02487 | Filed Jul. 25, 2001 |
| PCT Patent Application No. PCT/DE01/03947 | Filed Oct. 16, 2001 |

The Background of the Problem: Congestion Pricing/Road Pricing

The practice of charging tolls for road use is well established in many countries. The use of toll booths to gate the entrances and exits to highways, bridges and tunnels whether manned to collect cash or gantries to read RFID/DSRC devices are well understood. Concepts of high occupancy toll (HOT) lanes are also becoming more familiar. Several cities already employ methods to charge tolls for whole downtown districts (e.g. London and Singapore) using a variety of technologies such as pre-purchased passes (displayed in the window of the vehicle), gantries for RFID readers, license-plate recognition, etc. All of these systems require considerable physical infrastructure and considerable labour for enforcement, both of which are costly and inefficient both operationally and from an economic pricing perspective.

In addition to the issue of construction and operating costs, the critical issues of responsiveness and flexibility need to be addressed. As much as a system relies on physical infrastructure (booths, gantries, stationary cameras) that system is inflexible, costly to modify and rigid in its ability to address changing needs. The need for on-board meters that can determine vehicle position and communicate wirelessly with a central service is increasingly apparent and in demand. The need to price any road within a region in order to manage traffic and congestion implies that such means are the only ones tenable, since the infrastructure costs for cameras and gantries on every roadway make them inefficient in such applications.

The present invention addresses all these road pricing issues.

The Background of the Problem: Pay-As-You-Drive (PAYD) Insurance

Insurance premium calculations rely on risks as they are understood to be affected principally by gender, age, value of vehicle, history of vehicle model, and driving record. The risk contributions from issues such as where one drives, when one drives, or how much one drives (or where one parks) are not included in a reliable or equitable manner and remain as cost externalities. For this reason half of motorists pay too little in premiums while half overpay. To resolve this inequity and to bring efficient market principles to bear on the pricing of insurance premiums for motorists, the concept of PAYD has been developed within the insurance industry. Technology trials to date have included monitoring speed and distance using positioning technology and using odometer readings to help assess premiums. Technology dedicated to PAYD implies that insurance premiums would have to be incremented accordingly to pay for that technology.

The present invention addresses all these insurance premium pricing issues.

Background: Efficient Pricing for Parking and Congestion

This invention specifically sets out to resolve the problem of efficient pricing for parking and road use guided by the application of any or all of the following principles many of which are from William Vickrey (Vickrey, W. S. (1969). "Congestion Theory and Transport Investment". *American Economic Review (Papers and Proceedings)* 59, 251–261).

Pertaining to Both Parking and Congestion:

(1) Rates can be set to vary according to location and time of day in an arbitrarily timely, detailed, and continuous manner;

(2) Pricing may be graduated throughout the period of use, as opposed to being fixed for a particular time, a particular starting point or a particular ending point;

(3) Usage rates may be changed without modification of physical signage, without modification of physical meters and without modification of in-vehicle devices;

(4) Usage rates may vary smoothly over location and time (no abrupt shoulders in rate curves);

(5) Pricing can be calculated by the minute.

Specific to Parking Pricing:

(6) Additional, graduated, parking charges can be levied in lieu of parking tickets;

(7) The management of and collection for parking usage should be relatively free of theft and vandalism;

(8) Charging for small lots with only a few or even only one parking spot can be economically viable.

Specific to Road Pricing or Congestion Pricing:

(9) To manage congestion most efficiently, charges should be influenced by the specific impact a particular trip has had on the congestion conditions at the time of the trip, rather than be based on a schedule fixed in advance;

(10) Congestion Pricing can be calculated over arbitrarily small trip segments rather than from one observation point to another in order to allow the maximum flexibility to control congestion;

(11) In order to assure fair pricing of service vehicles such as taxis, trip charges can be calculated and made available in realtime.

All of the above principles, excepting 6, 7, and 8 apply to insurance pricing as well as they do to road pricing.

The Technology Background

Definitions: In this document, a continuous log of a vehicle's position is gathered and retained ("position-log"). A position-log is a collection of either parking episodes ("parking-log") or journey segments ("journey-log"), or both. Journey segments are further divided into the time-marked path of travel ("track-log") and the correlated time-marked congestion conditions ("congestion-log").

With respect to parking pricing, this invention pertains to the ability to measure the position, arrival time and departure time ("parking episode") of a parked vehicle with sufficient accuracy on which to base a reliable and trustworthy billing system. A parking application that uses this technology typically involves three parties: a vehicle operator (or its owner/registrant); an owner/operator of a parking lot/spot, and a metering and billing service or agency that collects fees from the vehicle owner on behalf of the lot owner. A vehicle owner registers a vehicle in a parking agency-service and attaches the subject location apparatus to said vehicle. A parking lot/spot owner/operator subscribes to a metering and billing service and permits registered vehicles to park on his lot/spot without immediate pre- or post-payment or any other form of parking metering. The parking agency-service detects the exact parking position (spot), time of arrival and time of departure and calculates a bill accordingly. In many cases (sufficiently open sky), there is no requirement for ground-based equipment, excepting the subject apparatus, which is installed on or in the vehicle. In some cases (e.g., underground parking) it may be necessary to integrate with other technology such as RFID to open gates and to confirm arrival and departure times.

To utilize this invention and its related service for parking pricing, a lot owner/operator should provide an accurate spatial description in the form of bounding polygons of the parking lot/spots to be billed and a set of parking rules (times, rates, free initial period, overtime penalties, etc).

With respect to road pricing, this invention pertains to the ability to measure the track-log and congestion-log of a vehicle with sufficient accuracy on which to base a reliable and trustworthy billing system. Its application typically involves three parties: a vehicle operator (or its owner/registrant); a road authority, empowered to collect usage tolls on selected or all roadways, and a metering and billing service that collects from the vehicle owner on behalf of the road authority. A vehicle owner registers a vehicle in a road-use subscription service and attaches the subject apparatus to said vehicle. A road authority operates or subscribes to a metering and billing service and permits registered vehicles to drive on its roadways without immediate pre- or post-payment or any other form of metering or collecting. This invention detects the exact route (location and time) and calculates a bill accordingly and charging or debiting the owner's account in an automated fashion. A major advantage of this approach is that gantries to hold RFID/DSRC or LPR (license plate recognition) technology are unnecessary for metering, although LPR, strategically mobile, likely has a critical role in enforcement.

To utilize this invention and its related service for road pricing, a road authority must provide an accurate spatial description in the form of driving lanes, lane usage rules, a schedule of fees or rules to derive fees in the contexts of location, time-of-day, and/or relative congestion.

With respect to pay-as-you-drive ("PAYD") insurance this invention is applied in a similar manner to that of road pricing except that premium rates would be set based on risk calculations. Hence the digital maps would be essentially the same, but the premium calculations would differ from road pricing calculations.

In any of the cases of parking pricing, road pricing or insurance pricing, business issues such as billing, collecting, and proof of subscription are basically well known. Issues of technology-enabled compliance monitoring may be handled by license-plate recognition technology.

In this document, "GPS" is used broadly to refer to any reliable positioning system, civilian or military, GPS, GNSS, Galileo, GLONASS, LORAN or other. In North America the positioning system most likely to be used would be the US system specifically known as GPS, but this invention can use signals from any instance of a reliable positioning system, including those not space-borne.

Space-borne positioning systems typically have three major components: Space Segment (the satellites), Ground Segment (the measurement, calibration and communication systems that keep satellites on track and accurate), and the User Segment (the end user devices that are required to apply the GPS signals. The methods and process described here are incorporated within the User Segment.

There are a large number of patents granted or filed that address the question: "Where am I?" These describe devices, methods and components to utilize GPS data in civilian contexts to locate people, vehicles or assets, to deliver context and location specific information to a user of a GPS-enabled device or to navigate, optimize, manage, rescue, or track. Such information may be related to distance estimation, trip planning, realtime navigation, surveying applications, playing golf, location-dependent advertising, location-specific advice or information, and many other applications. Many of these patents address receiver design, accuracy, filtering (noise removal), miniaturization, etc—i.e. they address reliability, accuracy and dependability of signal reception. Similarity, there are many patents to address the E-911 initiative for locating cell phones (many E911-related location methods do not currently utilize GPS). Inexpensive receivers, based on these inventions boast single measurement accuracies in the range of 3–10 meters.

Another subset of User Segment inventions address the question "Where is the vehicle, asset, child, parolee, or patient?" on behalf of an owner, parent, parole officer or care-giver. These tracking, monitoring, optimizing or security applications generally utilize a display-less receiver-transponder that determines and transmits its location to a service that can display or interpret the location of the device in a central service environment. Some transmit in real time, while others store successive locations ("tracklog", or "breadcrumbs") for later use or on-demand upload to a service or a PC. The method and apparatus described in the present invention belongs to this subset of location applications.

Characteristics of this subset of inventions include a small, dependable, receiver/transponder that is often accompanied by a dedicated processor and configured for a specific purpose, a service component (data center), and a telecommunications link and protocol.

With regard to devices that capture and store tracklogs there are a number of properties and constraints that limit prior art in its application to the problem of metering vehicles. Limitations of prior art that are addressed by this invention include:

(1) Accuracy. Parking requires reliable, inexpensive, meter or sub-meter accuracy. Accuracy requirements are similar for road pricing, when differentiation between an HOT lane and an adjacent, non-HOT lane is required. This currently requires a more expensive GPS device to gather sufficiently accurate positioning signals. This invention includes: (a) on-board filtering and compression 6, 10 specific to the properties of parking-logs, (b) a specialized journey-log compression algorithm 12 that conserves critical congestion information that is lost in prior art for tracklog compression, and (c) post-processing 28 specific to the problem of lane-of-travel identification for multiple users for the road pricing problem.

(2) Storage. It may be necessary to store position-logs for days or months to conserve telecommunication bandwidth, to utilize and optimize DSRC upload technologies, or to wait until a vehicle is powered on to provide power for transmission. This invention includes a compression technique specific to the problem of parking 10, and a second compression technique specific to the problem of congestion 12. In addition, on board memory and memory management algorithms 16 manage store-and-forward processes for these compressed position-logs.

(3) Service viability. Redundancy is required to ensure uninterrupted metering and billing. This invention includes a method to use two peer devices to provide mutual failover and failure notification to the service component.

(4) Power consumption. Most such devices either require frequent battery replacements or take power from a vehicle. To make installation easy and non-invasive, either battery or solar power may be preferred. Although power source is not a consideration, here, this invention includes the design of collection, compression and uploading of data in a way to conserve scarce power and telecommunications bandwidth. In addition, device hibernation is used during parking episodes once an accurate position is locked down.

(5) Telecommunication consumption. To be always-connected (critical only in certain applications) communication costs can become prohibitive. Until this changes, methods are required to store data on-board until most effectively uploadable. This invention includes compression, store-and-forward algorithms, short-range wireless uploads (e.g. DSRC or UWB) to pre-empt GPRS or equivalent uploads, and optional learning algorithms to reduce communication costs. In this way it is possible to upload off peak as well as in a daily or weekly cycle as best suits the application 18.

SUMMARY OF THE INVENTION

The invention provides a system for monitoring, measuring, and/or usage metering of a vehicle involving tracking continuous movement and position of said vehicle comprising: an apparatus mounted on or in the vehicle, comprising:
a receiver for receiving positioning signals;
a motion detector;
an RFID and/or DSRC element;
a processor for forming a continuous, time-marked position-log from the positioning signals, comprising: a memory; a storage element; and a two-way wireless telecommunication element, such as GPRS, to transmit position-logs;
a central processing system comprising: a central telecommunication element to demand, receive and acknowledge receipt of position-logs and system information from the apparatus; digital maps and databases for containing usage fees, premium rules, parking fees and schedules; a central processor to further process position-logs, calculate user fees and generate invoices, maps and data feeds; and a central storage element.

This invention further provides a method for monitoring, measuring, and/or usage metering of a vehicle involving tracking continuous movement and position of said vehicle, comprising the following steps:
using a mobile communication device mounted on a vehicle to performs steps comprising the following: receiving signals for generating a position-log for a vehicle; determining for each element of the position-log whether it is part of a journey-log or a parking episode; marking the beginning and end of each journey-log segment and parking episode applying distinct compression methods for journey-log segments and parking episodes; retaining compressed congestion information within the journey-log segments; storing position-logs; sending the position-logs to a central processing system on a scheduled or demand basis; and
using the central processing facility to perform steps comprising the following: scheduling, demanding, receiving and acknowledging transmissions from vehicles; post processing of compressed position-logs for final error removal and data collation; for each parking episode, establishing whether it was located in a subscribing parking spot and determining the parking fee payable; for each journey-log, determining any road-usage fee due and/or insurance premium due.

DETAILED DESCRIPTION

The key issues that this invention addresses are cost, accuracy, reliability, flexibility and multiple concurrent purposes. The key elements used to address these enables the use of inexpensive receivers to gather accurate measurements that are inexpensive to transmit and can be deployed in a multi-purpose system that is unlikely to fail.

With regard to the areas of parking pricing, road pricing, or insurance pricing, this invention is distinct in one or more of the following ways:

(1) The subject invention handles road pricing, parking pricing, and insurance-pricing equally effectively, and possibly concurrently.

(2) Because satellite positioning technology is used as the preferred location mechanism, there may not be a requirement for external, ground-based equipment, especially such systems utilizing gantries for DSRC or LPR in order to meter compliant vehicles. Although it is reasonable to consider the use of mobile or even gantry-mounted LPR as enforcement tools, that is a deployment decision independent of metering and this invention.

(3) There is no requirement for a user interface for the on-board component. In fact a user interface may make it unnecessarily complex while diminishing system reliability and threatening system viability.

(4) There is no requirement for on-board information regarding the application. In particular, there is no on-board need for digital maps, payment systems, or usage rules and fee schedules for parking, road use, or insurance. This provides for maximum flexibility by allowing for the addition or deletion of roads or parking spaces and the modification of times or prices without download to the on-board device. Compared to prior art for transport pricing using positioning technology, this invention provides for an extremely thin on-board environment.

(5) Because of the nature of the security algorithms used, there is a greatly enhanced level of security and privacy protection, thereby alleviating personal privacy concerns.

FIG. 1 is a depiction of the major components in relationship to each other of this preferred embodiment. One or more apparatus 102 mounted in or on Vehicle 104 receives position signals from satellites 106, and after some processing forwards compressed, intermediate results to central processing system 108, for further processing, generation of invoices for parking, road-use and insurance, and for the generation of maps, and various data feeds.

FIG. 2 is a flowchart which illustrates an overview of the methodology of a preferred embodiment of the system including an on-board apparatus 2 102 and data center (also known as central processing system) 22 108 components and all parking pricing and road-pricing components. Not all elements are required for every correctly operating instance of the system.

FIG. 3 shows 100 consecutive data points (position readings) 110 taken from a stationary platform for a preferred embodiment; the circle 112 is radius 5 m around the actual platform location. This conforms to the specification that 95% of the position data points fall within 5 m (for the particular device used). Theoretically, as a greater and greater sample size is accumulated the average tends to the true location while the standard error tends to zero. In practice, a bias may be present, and there are published methods to remove many of those, as well.

FIG. 4 depicts a parking situation for a preferred embodiment in which two different subscribers (e.g., a municipality and a private lot operator) have spots within three meters of each other. Note that the targeted vehicle 104, in a spot in the private lot, records many individual readings that are not within the spot it is parked in. Indeed a few stray readings 116 are within or even beyond spots in the municipal area. This invention includes processes to resolve this problem.

FIG. 5 depicts an exaggerated and artificially tidy (random variation is not depicted) illustration of a situation in which cars 104 traveling in an HOT lane produce journey-logs 120 whose absolute positions are biased but whose relative positions are correct. Using data from a group (mob) of vehicles 122 that are concurrent and co-located, statistical techniques allow categorization of cars 104 into lanes of travel and correction for any bias. This is intended to be used only in cases of ambiguity or requirement of proof of charges.

Addressing Cost in a Parking Application

In the case of parking pricing applications, cost is addressed by applying a process and method for filtering parking-logs to gain sufficient accuracy of position and time from repeated measurements 6, allowing the use of inexpensive receivers. Cost is also addressed by the use of compression 10, specifically designed for parking-logs in order to reduce telecommunication expense.

On-board, filtering for compression and accuracy of parking information relies on properties of GPS data, the principle property being that each model of receiver has known statistical error behaviour—for example, many inexpensive devices utilizing DGPS specify that 95% of the measures taken are within three to five meters of the true position (see FIGS. 3 and 4). Such statistical properties can be measured and highly reliable estimators can be derived regarding the number of successive measurements that are required to be certain that a vehicle's position data exhibits stationarity (that quality of a process in which statistical moments (e.g., mean and covariance matrix) of the process do not change with time) and how many samples must be accumulated to state a vehicle's position within an arbitrary accuracy. As an example, these statistical properties allow a statement such as: "Given a sampling rate of one per second and a device accuracy of 3 m, the position of a stationary vehicle can be determined to within 1 meter in M minutes within a statistical error of $10^{-6}$. This ability to generate a sufficiently accurate position with an inexpensive GPS receiver is key to this invention relative to parking. Once an accurate position is assured, data collected for the settling period can be reviewed for inclusion in the "parked" time, so that a majority portion of the M-minute settling period can be allocated for an accurate measure of the start time. The same procedure is used in reverse for the finish time, to enable parking pricing to the nearest minute.

This filtering process proceeds (within the apparatus mounted in the vehicle) as in the following example (the control parameters for this algorithm are not fixed, and the ones used here are for illustrative purposes only):

Each minute, collect 60 samples with an inexpensive location device.

For each pair of successive, 1-minute samples, calculate the statistical moments required to determine statistical stationarity and statistical equivalence between two successive minutes. Two successive minutes that satisfy these criteria become a candidate for the initiation of a parking episode, while the pooled mean becomes the candidate position of a parked car.

Continue this during minutes {3,4 . . . M} to confirm within pre-set accuracy levels that the vehicle's location measurement exhibits stationarity at position P and the time of minute M; else discard this as a candidate parking episode.

Figure 1:
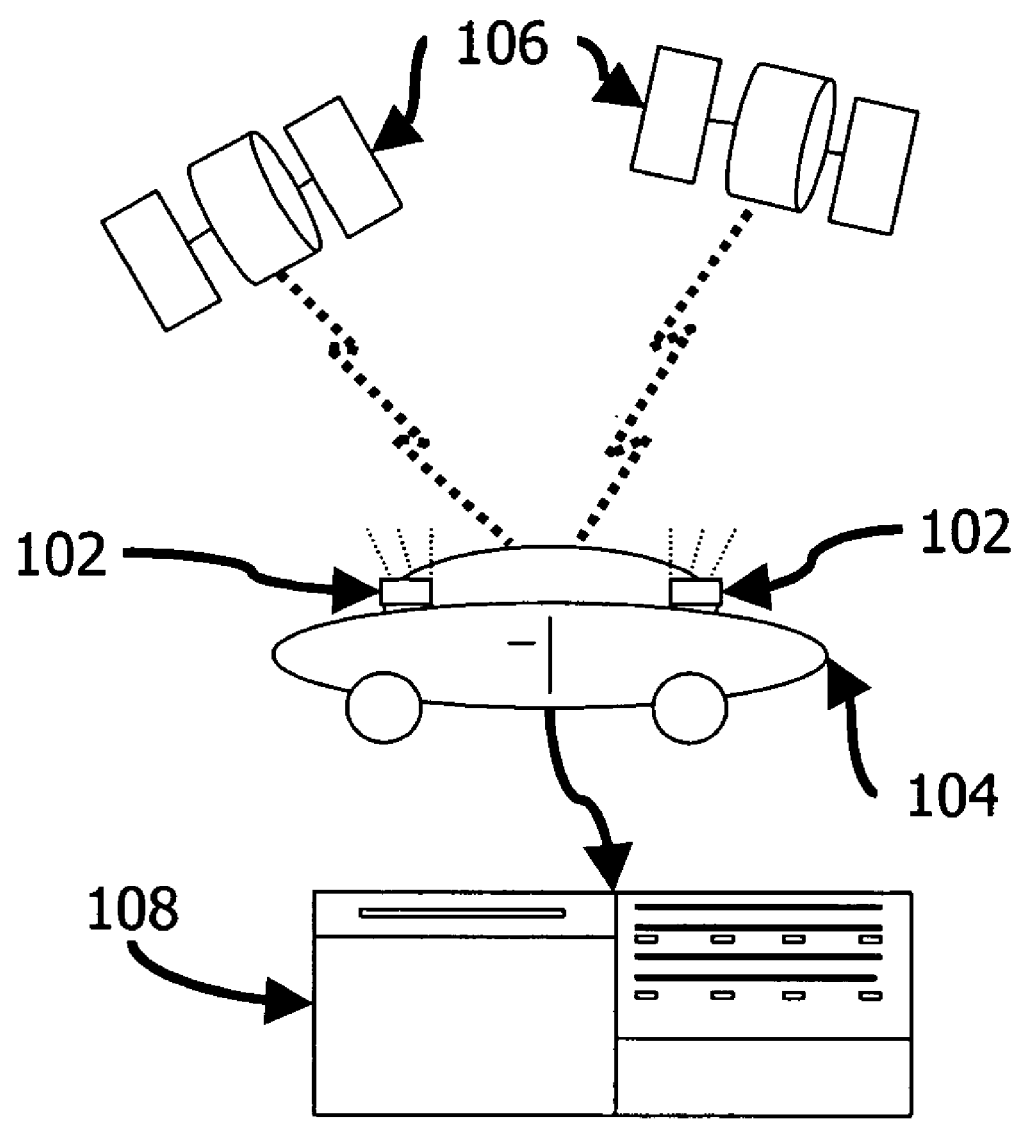
FIG. 1 is a diagram of major components of the present invention according to the preferred embodiment.
Figure 2:
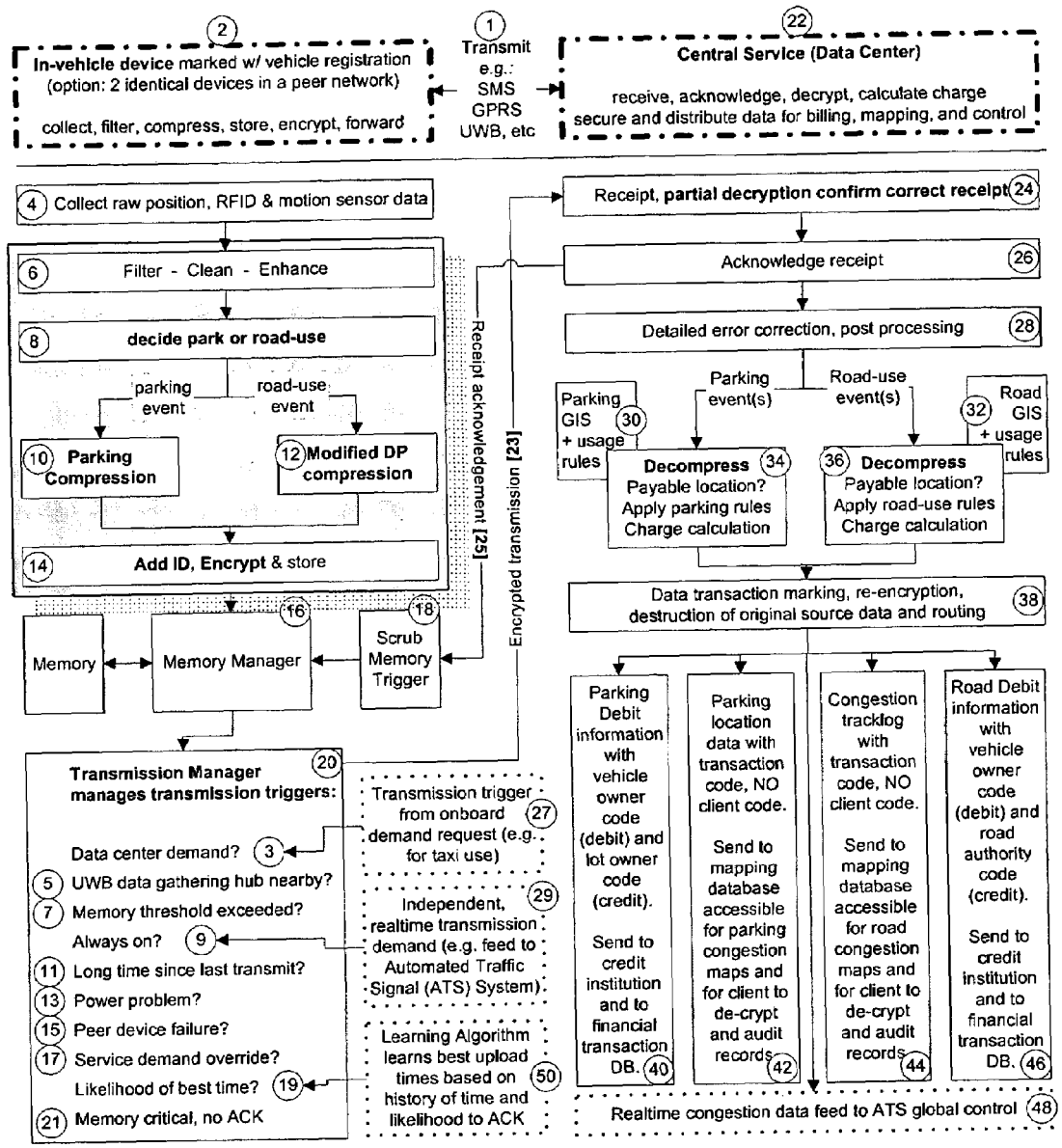
FIG. 2 is a flowchart of the method of the present invention according to the preferred embodiment.
Figure 3:
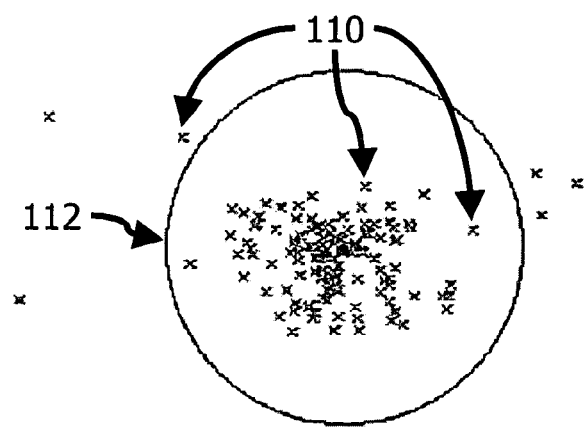
FIG. 3 is a plotted diagram of consecutive data points (position readings) taken from a stationary platform for a preferred embodiment.
Figure 4:
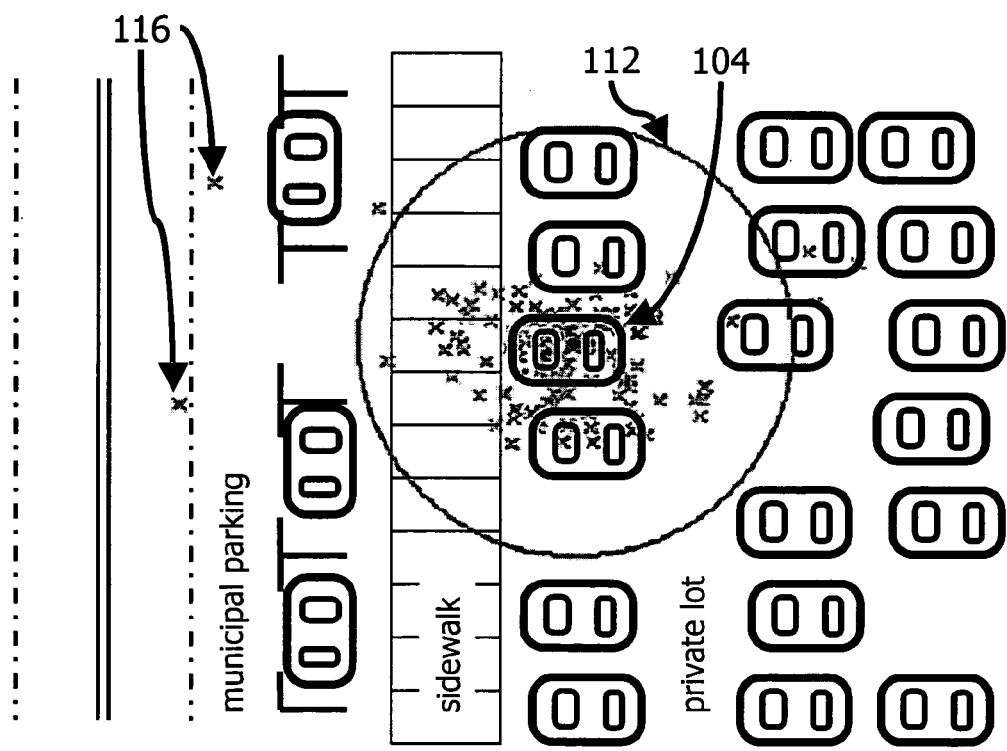
FIG. 4 is a plotted diagram of a parking situation for a preferred embodiment.

Recalculate in reverse through the data from minutes {M−1, . . . 2,1} to assert an arrival time as close as possible to the actual arrival time.

Continue sampling and testing the statistical properties of the location data for each minute {M+1, M+2, . . . } against the hypothesis that the vehicle's location measurement continues to exhibit adequate stationarity to confirm a sufficiently exact location.

Alternatively, given that the incorporated motion detector has registered a motionless state and the stationarity of the positioning signal allows determination of an precise (but possibly biased) position, the device may hibernate to be awoken only upon the detection of motion.

When the hypothesis fails, or the motion detector detects motion, establish the conclusion time and summarize the entire event as a parking episode (position, start time, end time).

This description is the simplified core of an operational algorithm to accurately identify and measure a parking episode using an inexpensive receiver. The fact that GPS satellites are not geostationary and that a vehicle may be in an urban canyon (restricts the number of visible satellites) or beneath foliage (scatter) means that signal stationarity is not guaranteed. Hence urban canyon and foliage, as may be resolved, will require somewhat more complex statistical analyses, but with the same result: position, arrival and departure times of sufficient accuracy on which to build a reliable and trustworthy billing system.

This process is not required to determine whether a vehicle is standing still—that can be done more effectively with the motion sensor 4 that is incorporated into this invention. This process is used to determine whether the vehicle is in a spot for which it is possible to receive a statistically stationary reckoning of position. Since this is not possible in every open-air, ungated parking spot, all such spots must be pre-measured to determine suitability for this method. Currently a large portion of parking spots satisfy this criterion. As positioning technology improves—or with the use of more expensive receivers—the portion of spots that are eligible will increase. A process for pre-measuring parking spots includes a survey activity for each contiguous set of spots (parking lot, or strip of on-street spots). This survey would determine whether the desired accuracy can be achieved using a GPS device with the accuracy of the receiver used in the subject invention throughout a 24-hour period and throughout all seasons (foliage).

There is the special case of a parked vehicle parked in radio shadow (underground, under foliage, or in an urban canyon). In many instances, noting that a vehicle ceases receiving reliable positioning signals information at a certain position then restarts later from that same position (as might occur on entering or departing a parking garage) it is reasonable to infer a parking episode. The issue of establishing whether the position inferred is within a subscribing parking lot/spot will be determined by the central processing center. Naturally, in the circumstance of gated parking lots, access to a spot might be provided via RFID which provides for existing technology to identify vehicle (customer), position and time of parking episode. For this reason links to, and incorporation of, RFID technology is part of this invention 4.

Cost, as it pertains to storage and telecommunications usage, is addressed by including a system and method for compressing position-logs to reduce data volumes.

In this invention, compression with respect to parking takes advantage of the fact that one is only concerned with the time the vehicle is stationary. Hence, the output of processing will be position, start time, and finish time. Most data judged to come from a moving vehicle or from a vehicle that is remaining stationary relative to the prior time period may be discarded in the case of a parking-only application. A few critical measures of settling times, including some of the raw or partially processed data, may be retained to provide additional flexibility for the central billing process to prove accuracy of determination of settling time. This flexibility might be needed to make the necessary adjustments to ensure unquestionable fairness of the amount billed, which would now likely be measured to the nearest minute. As well, evidence of the data collected just prior and just after the time of parking lock-in may be useful as evidence of the original measurements to prove fairness of the bill. In general, for a device that is collecting data every second for 24 hours, the amount of data to be uploaded to represent, say, 5 parking episodes would be on the order of 10 kb or less whereas the full raw data set would be on the order of 1 Mb, a compression ratio of 100:1. To this reduction in retained data, known compression techniques may be added prior to data encryption. Principal among these are well-known delta-encoding and Lempel-Ziv (LZ) techniques, which taken together provide an additional order of magnitude of compression, depending on the data retained. If all data were discarded excepting position, start and end, one would expect a compression ratio of approximately four orders of magnitude compared to raw, second-by-second position-logs. This implies that the more process intelligence is applied to the device, the less demand one would expect on storage or telecommunication services.

Reliability, as it pertains to assurance that the device has a reduced likelihood of being excluded from service by accident, malice or failure is addressed by using two, independent, self sufficient, intercommunicating, receive-filter-compress-store-forward devices on a single vehicle.

These two devices, identical in everything excepting an IP address, comprise the complete on-board component for this invention. This is a two-element, peer-to-peer net providing redundancy and mutual fail-over. While only one of the devices needs to upload its data to a central processing center, encoded in that upload is information regarding the health of both devices. Each peer device would be programmed to trigger an upload as soon as the other component failed. System faults can thus be recognized early and remedied sooner reducing the likelihood of excluding a vehicle from the network.

Figure 5:
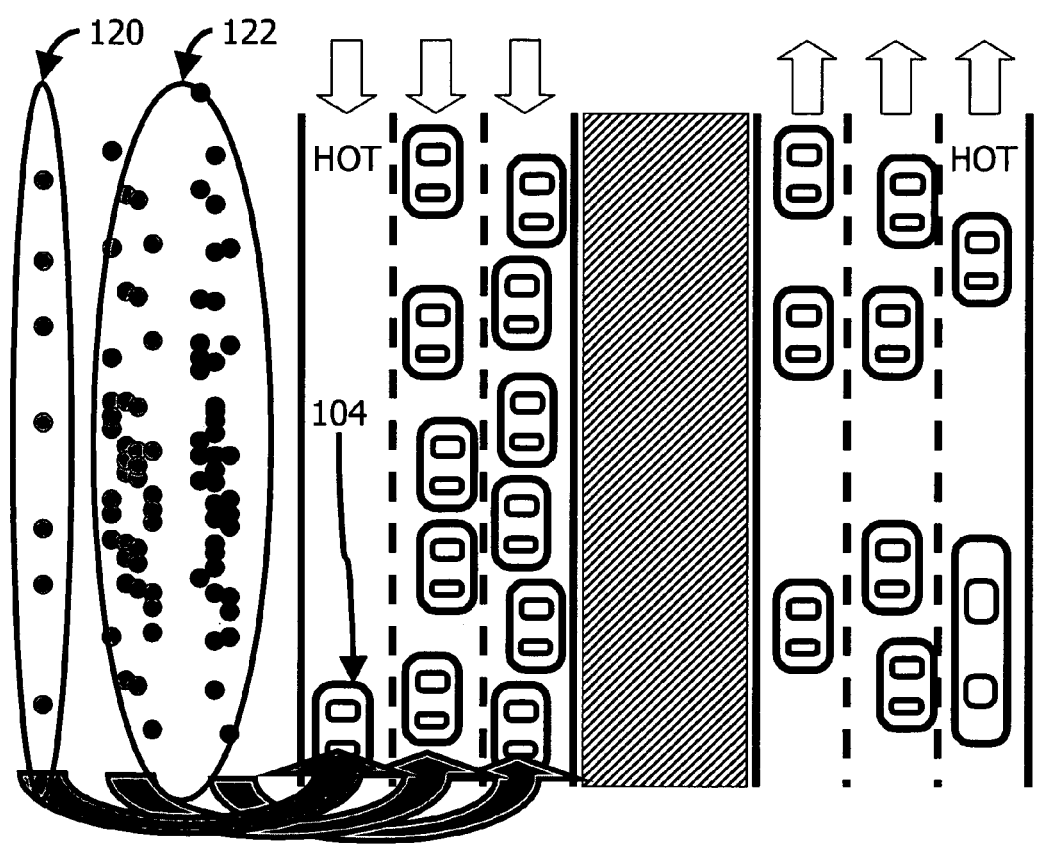
FIG. 5 is a plotted diagram of a HOT lane situation showing journey-logs.

In the case of road pricing applications, companion algorithms running at the central processing center and including the use of concurrent and co-located journey-logs from other vehicles can be used to further process a specific journey-log to identify which lane (in a multilane highway) a moving vehicle is in 28. This is useful to remove position bias in order to distinguish HOT lanes from non-HOT lanes (FIG. 5). In addition, post-processing at the center can also include additional information to address bias effects as given by ionospheric disturbances, etc.

Addressing Cost in a Road Pricing Application

In order to enable fully efficient road pricing programs, sufficient positional information to determine exactly which lane a vehicle is traveling in must be retained. This extreme scenario handles the case of differential pricing of two adjacent, fully communicating lanes carrying traffic in the same direction, one HOT the other not (FIG. 5). Methods to optimally compress the position elements of such a journey-log are already known (for example Douglas-Peucker or "DP"). These algorithms turn an over-sampled series of positions into a smaller series of vectors (start-point, end-point) so that the same track is represented with fewer data points and with bounded spatial error (the "hull" in the case of DP line compression). The present invention makes two modifications 12 to this known compression method as applied in preferred embodiments.

The first modification of the DP method is that the event time for the start of each compressed data vector is retained in order to establish the exact times of each new sub-segment of the track-log. This time-marked track-log allows a fully detailed breakdown of a journey for charging by time-of-day and road traveled to provide for any level of congestion management according to Principle 1, 2, 4 and 10, above.

The second modification to DP for the creation of a compressed journey-log that is incorporated in this invention is the identification, storage, and compression of congestion information. One definition of congestion of a system of roads and intersections is derived from the likelihood that cars queued at red signals within the system do not clear those intersections during a full cycle (red-green-back to red). Naturally, as cars may remain queued through two or more light cycles, congestion may back up to a prior intersection causing gridlock, an extreme condition of congestion, similar to that caused by a crash. It is possible to infer and measure congestion from the velocity changes in a journey-log. A concurrent collection of journey-logs would provide invaluable information about specific, temporary congestion for the purpose of aiding navigation algorithms used in the kind of automotive navigation aids presently in popular use. This would work for normal rush-hour congestion as well as for congestion due to crashes, special events, construction, etc.

Additional Impacts of the Use of This Invention

In the subject invention, congestion information is compressed and inserted on a segment-by-segment (vector-by-vector) basis into time-marked, DP output. This is computed by taking a second pass through the raw data to extract velocity information. The result of this, a congestion-log, is retained for each vector (straight segment) of the compressed DP track segments. Taken together, this compressed data set of where, when, velocities and velocity changes constitutes a complete journey-log, which can be used to satisfy Principle 9. In its most sophisticated form, the journey-logs of a mob of vehicles within a defined traffic area can be used to back calculate the effect of a single journey on the then-current congestion circumstances to derive the optimally efficient congestion charge. Admittedly, this may be too complex a concept for realistic vehicle-by-vehicle charge calculations, but this data is invaluable to general realtime navigation, optimization of a large array of traffic signals and certain components of traffic demand management (TDM) planning. For that reason collecting, aggregating and distributing this information is useful even if not used to calculate fully efficient congestion pricing for individual trips.

Finally, this congestion information is useful in a multilane (HOT and non-HOT) environment (see FIG. 5). In the case that raw location information is insufficient to determine the lane of travel (due to scatter or multipath error), a group of simultaneous and co-located trip segments would show relative positions in a way that allows distinction among the absolute lane positions. In the circumstance of an HOT lane that is consistently moving faster than the adjacent non-HOT lane, that information will be apparent by comparing the congestion-logs of adjacent lanes. Knowing relative information about individual vehicles in a mob of vehicles allows the inference of absolute position (lane) of those individual vehicles.

This invention benefits vehicle owners by removing all of the annoyances of using mechanically metered parking or any form of active toll payment for road use. It may benefit owners and operators of parking facilities by reducing equipment costs, abuses by vehicle owners and employees and by enabling small, otherwise uneconomical lots to become a viable source of revenue. It may benefit road authorities by enabling economically efficient electronic road pricing (ERP) to be deployed in the most cost effective manner, as well as building congestion databases to be used for planning and control.

This invention implements a wide variety of parking and road-use policy and allows the flexibility to manage the most efficient (and fair) methods of pricing these commodities in order to include both internal and external transport costs, thereby removing possible pricing inequities from transport systems.

It will be appreciated that the above description relates to the preferred embodiments by way of example only. Many variations on the system and method for delivering the invention will be clear to those knowledgeable in the field, and such variations are within the scope of the invention as described and claimed, whether or not expressly described.

What is claimed is:

1. A system for monitoring, measuring, and/or usage metering of a vehicle involving tracking continuous movement and position of said vehicle comprising:
    an apparatus mounted on or in the vehicle, comprising:
        a receiver for receiving positioning signals from a signal source;
        a motion detector for determining parking episodes of the vehicle to form a parking-log;
        an RFID (Radio Frequency Identification) and/or DSRC (Dedicated Short Range Communications) element for determining entry and exit data based on movement of the vehicle into or out of gated areas;
        a processor for forming a continuous, time-marked position-log from the positioning signals having regard to the parking-log and the entry and exit data, the processor comprising a memory;
        a storage element for storing position-logs; and
        a two-way wireless telecommunication element, such as GPRS, to transmit position-logs;
    a central processing system, in communication with the apparatus, comprising:
        a central telecommunication element to demand, receive and acknowledge receipt of position-logs and system information from the apparatus;

digital maps and databases for containing usage fees, premium rules, parking fees and schedules;

a central processor to further process position-logs, calculate user fees and generate invoices, maps and data feeds; and a central storage element for storing the maps, databases, position-logs, and system information, wherein the position-log contains optimized positioning signals processed to correct for multipath error when the vehicle is in either open or obscured line-of-sight from the signal source.

2. The system of claim 1 wherein the receiver receives one or more positioning signals comprising at least one type of signal from the group represented by GPS, GNSS, Galileo, GLONASS, and Loran.

3. The system of claim 2 wherein the positioning signals further includes a type which is boosted, corrected, differenced or retransmitted location signals for resolving reception problems including multipath, shadow, scatter, and ionospheric disturbance.

4. The system of claim 1 wherein:

position-logs are sent encrypted and on a scheduled and/or demand basis from the vehicle to the central processing system;

the central processing system and the apparatus comprises means to determine whether the apparatus is operating correctly;

the processor uses a protocol to ensure that all data is received by the data center before reusing memory on the apparatus; and position-logs are transmitted to the central processing facility using a redundant methodology; wherein the wireless telecommunication element can substitute DSRC or equivalent wireless communication to off-load position-logs on an opportunistic basis to a receiving station other than the central processing system for subsequent non-wireless transmission to the central processing system, thereby avoiding GPRS usage for that transmission.

5. The system of claim 1 wherein:

parking usage can be metered and assessed for user fees;

road usage can be metered and assessed for user fees;

road usage can be metered and assessed for pay-as-you-drive insurance premiums;

spatial maps of usage volumes and/or congestion may be generated for planning, managing or reporting; and data feeds comprising usage, volumes, and/or congestion information may be generated for control, management, reporting and feedback.

6. The system of claim 5 wherein the processor:

determines whether the vehicle is parked, moving, or standing (part of a normal journey);

marks each segment of the position-log as a parking episode or a journey segment;

filters and compresses each parking episode or journey-log according to its special characteristics;

manages the storage of compressed position-logs until forwarded;

manages the forwarding of position-logs to the central processing system.

7. The system of claim 6, wherein additional processing for optimal accuracy contingent on whether the position-log segment is a parking episode or a journey segment comprising application-independent statistical methods, or GPS-specific methods.

8. The system of claim 6 wherein the processor extracts and compresses a parking episode by using a combination of the state of the motion detector and filtering related to signal stationarity to determine the temporal end-points of the parking episode.

9. The system of claim 6 wherein the processor in the vehicle apparatus extracts and compresses journey-logs using the Douglas-Peucker (DP) line compression algorithm, as modified by retaining time-stamp information and injecting an optimally compressed congestion-log for congestion-related pricing, navigation, control, and mapping applications, and allowing for extraction of a pure position-only track-log subset exactly matching the standard DP line compression.

10. The system of claim 5 wherein parking-prices are calculated by determining whether a parking episode has taken place within a parking spot where fees are payable according to a digital map and over a sufficient time period during which fees are payable according to rules stored in a parking-fee and schedule database.

11. The system of claim 5 wherein road-prices are calculated by determining whether a journey segment has taken place on a roadway where fees are payable according to a digital map, the event time, the length of time, and the degree of congestion during the journey segment according to rules stored in a usage-fee and schedule database.

12. The system of claim 11 wherein the degree of congestion during the journey segment is calculated by using at least one or both of:

a congestion-log information from a journey segment;

a congestion-log from at least one co-located and co-temporal vehicle by applying statistical pattern recognition techniques to resolve any positional ambiguities related to the exact lane a vehicle was traveling in during the journey segment.

13. The system of claim 5 wherein insurance-prices are calculated for a journey segment by determining whether the journey segment has taken place on a roadway where premiums are payable according to location on a digital map, the starting time, the length of time, and the degree of congestion during the journey segment according to rules stored in an insurance-premium database.

14. The system of claim 5 wherein the central data system retains all pricing information, digital maps, and fee schedule rule databases in order to apply flexible, highly responsive policy changes that effect graduated prices, locations, and times including pricing calculations that may incorporate the congestion behaviour experienced at the time of the journey.

15. The system of claim 14 wherein the databases may be modified in real-time for setting or calculating graduated location, graduated time, and graduated pricing with respect to changing pricing policies and transport demands.

16. The system of claim 5 that provides for optional, on-demand transmission of position-logs for the urgent purpose of adjustment of a financial record, acquisition of congestion information, location of a vehicle for emergency purposes, or for the purpose of pricing for service vehicles such as taxis, comprising:

a central processing system-to-vehicle request-respond protocol a vehicle-to-data center send-interrupt protocol a radio communication interface to a separate in-vehicle sub-system for receiving a signal to inject artificial break-points in a journey-log for starting and stopping a position-log and triggering an upload to the central data processing system for documenting a usage price in real-time.

17. The system of claim 5 wherein the central processing system initiates and receives real-time congestion-log transmission for generating real-time navigation feeds and real-time traffic signal control feeds.

18. The system of claim 5 wherein vehicle identification information and position-log information is encrypted is such a way that no person other than the vehicle registrant, using a decryption key, may gain access to any elements of the position-logs.

19. The system of claim 1 wherein the apparatus carries out failover using an redundant wireless 2-device network mounted in the vehicle for informing the central processing system while continuing to collect position-logs if one device fails or is excluded from service.

20. A method for monitoring, measuring, and/or usage metering of a vehicle involving tracking continuous movement and position of said vehicle, comprising the following steps:

using a mobile communication device mounted on a vehicle to performs steps comprising the following:

receiving signals for generating a position-log for a vehicle from a signal source;

processing the signals in the position-log to optimize the signals and correct for multipath error when the vehicle is in either open or obscured line-of-sight from the signal source;

determining for each element of the position-log whether it is part of a journey-log or a parking episode;

marking the beginning and end of each journey-log segment and parking episode applying distinct compression methods for journey-log segments and parking episodes;

retaining compressed congestion information within the journey-log segments;

storing position-logs;

sending the position-logs to a central processing system on a scheduled or demand basis;

using the central processing facility to perform steps comprising the following:

scheduling, demanding, receiving and acknowledging transmissions from vehicles;

post processing of compressed position-logs for final error removal and data collation;

for each parking episode, establishing whether it was located in a subscribing parking spot and determining the parking fee payable; and for each journey-log, determining any road-usage fee due and/or insurance premium due.

* * * * *